United States Patent
Münzer et al.

(10) Patent No.: US 9,040,871 B2
(45) Date of Patent: May 26, 2015

(54) PROCESS FOR PRODUCING A HOLE USING DIFFERENT LASER POSITIONS

(75) Inventors: Jan Münzer, Berlin (DE); Thomas Podgorski, Oranienburg OT Lehnitz (DE)

(73) Assignee: SIEMENS AKTIENGESELLSCHAFT, Münhen (DE)

( * ) Notice: Subject to any disclaimer, the term of this patent is extended or adjusted under 35 U.S.C. 154(b) by 466 days.

(21) Appl. No.: 12/855,090

(22) Filed: Aug. 12, 2010

(65) Prior Publication Data

US 2011/0036819 A1    Feb. 17, 2011

(30) Foreign Application Priority Data

Aug. 17, 2009    (EP) .................................. 09010546

(51) Int. Cl.
*B23K 26/00*    (2014.01)
*B23K 26/38*    (2014.01)
*B23K 26/06*    (2014.01)

(52) U.S. Cl.
CPC .............. *B23K 26/388* (2013.01); *B23K 26/063* (2013.01)

(58) Field of Classification Search
USPC .................................................. 219/121.71
See application file for complete search history.

(56) References Cited

U.S. PATENT DOCUMENTS

| | | | |
|---|---|---|---|
| 5,747,769 A | 5/1998 | Crow | |
| 6,024,792 A | 2/2000 | Kurz et al. | |
| 6,368,060 B1* | 4/2002 | Fehrenbach et al. | 416/97 R |
| 6,420,677 B1 | 7/2002 | Romin | |
| 6,744,010 B1 | 6/2004 | Ittleson | |
| 2003/0127438 A1* | 7/2003 | Richter et al. | 219/121.71 |
| 2004/0232122 A1 | 11/2004 | Byrd | |
| 2009/0057282 A1* | 3/2009 | Huang et al. | 219/121.71 |
| 2009/0283508 A1* | 11/2009 | Bolms et al. | 219/121.71 |

FOREIGN PATENT DOCUMENTS

| | | |
|---|---|---|
| CN | 1135148 C | 1/2004 |
| CN | 101119826 A | 2/2008 |
| EP | 0 412 397 B1 | 2/1991 |
| EP | 0 486 489 B1 | 11/1994 |
| EP | 0 786 017 B1 | 7/1997 |
| EP | 0 892 090 A1 | 1/1999 |
| EP | 0 950 463 A1 | 10/1999 |
| EP | 1 204 776 B1 | 5/2002 |
| EP | 1 306 454 A1 | 5/2003 |
| EP | 1 319 729 A1 | 6/2003 |
| EP | 1 813 378 A2 | 8/2007 |
| RU | 2085351 C1 | 7/1997 |
| RU | 2007144482 A | 6/2009 |
| WO | WO 99/67435 A1 | 12/1999 |
| WO | WO 00/44949 A1 | 8/2000 |
| WO | WO 2006069822 A1 | 7/2006 |

\* cited by examiner

*Primary Examiner* — Fernando L Toledo
*Assistant Examiner* — Neil Prasad

(57) ABSTRACT

Methods for producing a continuous hole in a substrate are provided. A laser is used for producing an inner proportion and a diffuser of the continuous hole, wherein an angular position of the laser with respect to the substrate is changed at least three times.

21 Claims, 5 Drawing Sheets

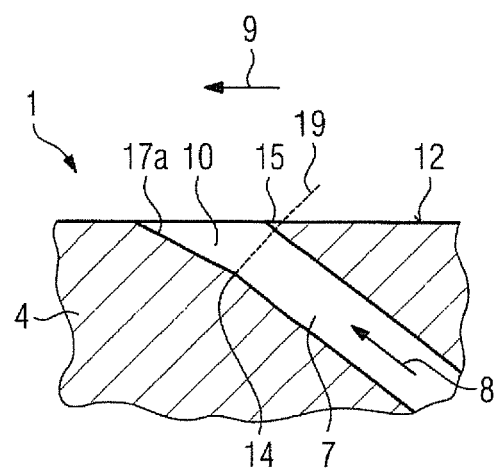
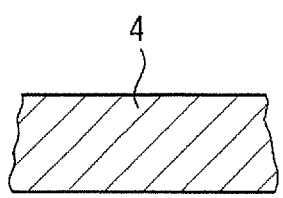
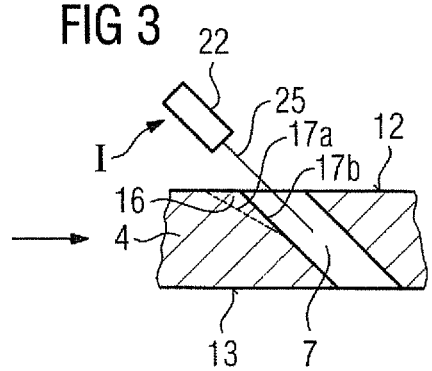
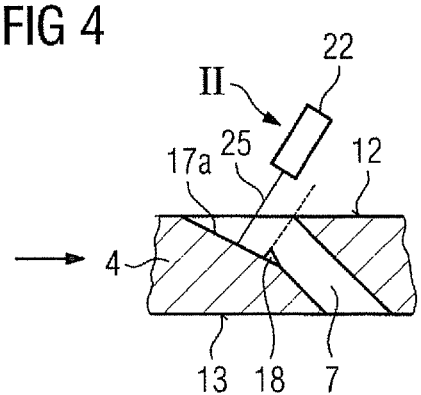
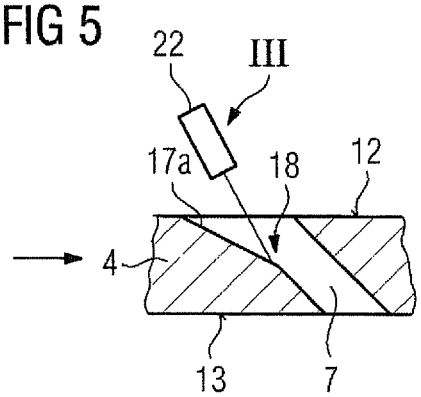

FIG 12

| Material | Chemical composition in % | | | | | | | | | | | | | |
|---|---|---|---|---|---|---|---|---|---|---|---|---|---|---|
| | C | Cr | Ni | Co | Mo | W | Ta | Nb | Al | Ti | B | Zr | Hf |
| Ni-base investment casting alloys | | | | | | | | | | | | | |
| GTD 222 | 0.10 | 22.5 | Rem. | 19.0 | | 2.0 | 1.0 | | 1.2 | 2.3 | 0.008 | | |
| IN 939 | 0.15 | 22.4 | Rem. | 19.0 | | 2.0 | 1.4 | 1.0 | 1.9 | 3.7 | 0.009 | 0.10 | |
| IN 6203 DS | 0.15 | 22.0 | Rem. | 19.0 | | 2.0 | 1.1 | 0.8 | 2.3 | 3.5 | 0.010 | 0.10 | 0.75 |
| Udimet 500 | 0.10 | 18.0 | Rem. | 18.5 | 4.0 | | | | 2.9 | 2.9 | 0.006 | 0.05 | |
| IN 738 LC | 0.10 | 16.0 | Rem. | 8.5 | 1.7 | 2.6 | 1.7 | 0.9 | 3.4 | 3.4 | 0.010 | 0.10 | |
| SC 16 | <0.01 | 16.0 | Rem. | | 3.0 | | 3.5 | | 3.5 | 3.5 | <0.005 | <0.008 | |
| Rene 80 | 0.17 | 14.0 | Rem. | 9.5 | 4.0 | 4.0 | | | 3.0 | 5.0 | 0.015 | 0.03 | |
| GTD 111 | 0.10 | 14.0 | Rem. | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rem. | 9.0 | 1.9 | 4.1 | 4.1 | | 3.4 | 3.8 | 0.015 | 0.02 | 1.00 |
| IN 792 DS | 0.08 | 12.5 | Rem. | 9.0 | 1.9 | 4.1 | 4.1 | | 3.4 | 3.8 | 0.015 | 0.02 | |
| MAR M 002 | 0.15 | 9.0 | Rem. | 10.0 | | 10.0 | 2.5 | | 5.5 | 1.5 | 0.015 | 0.05 | 1.50 |
| MAR M 247 LC DS | 0.07 | 8.1 | Rem. | 9.2 | 0.5 | 9.5 | 3.2 | | 5.6 | 0.7 | 0.015 | 0.02 | 1.40 |
| CMSX-2 | <.006 | 8.0 | Rem. | 4.6 | 0.6 | 8.0 | 6.0 | | 5.6 | 1.0 | <.003 | <.0075 | 0.10 |
| CMSX-3 | <.006 | 8.0 | Rem. | 4.6 | 0.6 | 8.0 | 6.0 | | 5.6 | 1.0 | <.003 | <.0075 | 0.10 |
| CMSX-4 | | 6.0 | Rem. | 10.0 | 0.6 | 6.0 | 6.0 | | 5.6 | 1.0 | | Re=3.0 | 0.10 |
| CMSX-6 | <.015 | 10.0 | Rem. | 5.0 | 3.0 | <.10 | 2.0 | <.10 | 4.9 | 4.8 | <.003 | <.0075 | |
| PWA 1480 SX | <.006 | 10.0 | Rem. | 5.0 | | 4.0 | 12.0 | | 5.0 | 1.5 | <.0075 | <.0075 | |
| PWA 1483 SX | 0.07 | 12.2 | Rem. | 9.0 | 1.9 | 3.8 | 5.0 | | 3.6 | 4.2 | 0.0001 | 0.002 | |
| Co-base investment casting alloys | | | | | | | | | | | | | |
| FSX 414 | 0.25 | 29.0 | 10 | Rem. | | 7.5 | | | | | 0.010 | | |
| X 45 | 0.25 | 25.0 | 10 | Rem. | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | Rem. | | 7.5 | 4 | | | 0.3 | 0.010 | 0.60 | |
| CM 247 | 0.07 | 8.3 | Rem. | 10.0 | 0.5 | 9.5 | 3.2 | | 5.5 | 0.7 | | | 1.5 |

PROCESS FOR PRODUCING A HOLE USING DIFFERENT LASER POSITIONS

CROSS REFERENCE TO RELATED APPLICATIONS

This application claims priority of European Patent Office Application No. 09010546.1 EP filed Aug. 17, 2009, which is incorporated by reference herein in its entirety.

FIELD OF INVENTION

The invention relates to a process for producing a hole, in which process the angular position of the laser with respect to the substrate is changed discontinuously during the processing.

BACKGROUND OF INVENTION

The use of the laser for producing holes in substrates where the laser is moved over the surface is known.

Processes for producing holes with side-delimiting flanks are known in the prior art. By way of example, U.S. Pat. No. 6,420,677 describes a process for the laser-assisted formation of cooling air holes in turbine blades or vanes. In this case, provision is made to discharge a sequence of laser pulses onto the surface of the turbine blade or vane, wherein parts of the turbine material are vaporized such that a hole is formed along a Z axis. The laser beam is discharged onto the blade or vane surface in an inclined manner at angles of +/−10-20° in relation to the Z axis during the processing.

SUMMARY OF INVENTION

It is an object of the invention to specify a process of the type mentioned in the introduction, in which no damage to the hole flank occurs as a result of interaction with the hole.

This object is achieved by a process as claimed in the independent claims. According to the invention, this object is achieved by a partial volume of the hole being formed in each of a plurality of production steps. The dependent claims list further advantageous measures which can be combined with one another, as desired, in order to achieve further advantages.

The basic concept of the invention is therefore to divide the overall volume of the hole to be produced into partial volumes and to form these in individual production steps. Firstly an inner proportion is produced. A remnant remains in order to form the diffuser of the hole. The component material of some of the individual partial volumes of this remnant is removed by a side flank of the hole being traced in each case with the laser beam.

The laser beam is preferably oriented such that it includes an angle of greater than 8° with the traced flank.

Since, during the production of the hole, the laser beam is not directed onto the component surface close to, and parallel with, the already-formed flank of the hole, an impermissible interaction between the laser beam and the flank is prevented. Furthermore, the division of the overall volume of the hole into a plurality of partial volumes allows complex hole geometries to be formed.

According to a further embodiment of the invention, the laser beam is oriented such that it includes an angle of greater than 10° and less than 90°, preferably of greater than 15° and less than 80° and particularly preferably of greater than 20° and less than 60° with the traced flank. An angle of 9° is especially preferred.

In one development of the invention, provision is made for a pulsed laser beam to be directed onto the component surface in the hole. In this case, a laser beam with a variable pulse width can be used. The pulse width can lie in the range of 50 ns to 800 ns, preferably of 70 ns to 600 ns and in particular of 200 ns to 500 ns. A pulse width of 400 ns is especially preferred. With such a pulsed laser beam, the component material can be vaporized particularly quickly. This is particularly advantageous for the production of the diffuser.

A laser beam with a frequency in the range of 20 kHz to 40 kHz, preferably of 25 kHz to 35 kHz and in particular of 28 kHz to 32 kHz can advantageously also be directed onto the component surface. This is particularly advantageous for the production of the diffuser.

A preferred development of the invention makes provision for a hole to be produced in a turbine component, in particular in a turbine blade or vane. The hole may be in particular a complete cooling air hole or a diffuser opening of a cooling air hole.

BRIEF DESCRIPTION OF THE DRAWINGS

FIG. 1 shows a film-cooling hole to be produced,
FIGS. 2-9 show schematic illustrations of the course of the process,
FIG. 12 shows a list of superalloys.

Figure 6:
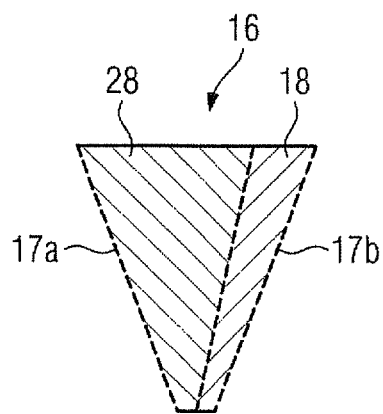

The description and the figures represent merely exemplary embodiments of the invention.

DETAILED DESCRIPTION OF INVENTION

FIG. 1 shows a hole 1 in a substrate 4. Particularly in the case of turbine components such as turbine blades or vanes 120, 130, the substrate 4 is a nickel-base or cobalt-base superalloy according to FIG. 12. The hole 1 is continuous (not a blind hole).

The invention is explained on the basis of a film-cooling hole, without the inventive concept being restricted.

A hot gas flows over the film-cooling hole 1 in an overflow direction 9. An outflow direction 8 of a cooling medium from the film-cooling hole 1 and the overflow direction 9 form an acute angle with one another.

The film-cooling hole 1 has at least two differently configured sections 7, 10; in particular, said film-cooling hole 1 has only two sections 7, 10.

The first section is an inner proportion 7, which preferably has a cylindrical or rotationally symmetrical cross section or preferably has at least a constant cross section in an outflow direction 8.

From a certain depth beneath an outer surface 12 of the substrate 4 up to the surface 12 of the substrate 4, the cross section of the film-cooling hole 1 widens considerably compared to the inner proportion 7. This represents the diffuser 10.

At a kink point 14 of a left-hand surface 17a of the film-cooling hole 1, which represents the transition from the diffuser 10 to the inner proportion 7 opposite, a perpendicular line 19 on the inner surface 17a intersects an opposing section 15 in the substrate 4 at the surface 12.

FIGS. 2-9 show the schematic course of the process for producing the hole 1. In the text which follows, a laser 22 is used by way of example as the processing machine.

The process begins with the provision of the substrate 4 (FIG. 2), which is then processed using a laser 22 or electron beam source in a first angular position (I), preferably the laser position (I).

The angle of the angular positions I, II, III is defined by a center line of a laser beam 25 and the surface 12 around the film-cooling hole 1. In this case, the inner proportion 7 is produced from the surface 12 as far as the opposing inner surface 13 of the substrate 4 (in the hollow space in the case of turbine blades or vanes) (FIG. 3).

Here, the laser 22 preferably does not have to be moved. In the process, a remnant 16 remains in the hole 1 to be produced in order to finish the diffuser 10 (FIG. 3). The inner proportion 7 is finished.

In a further step (FIG. 4) and in a second laser position II, which differs from the first laser position I, a first partial volume of the remnant 16, a left-hand partial volume 28 (FIGS. 6-9), is removed as the first section of the remnant 16 still to be removed for the diffuser 10. In this case, the angular position of the laser 22 with respect to the surface of the flank has changed in position II compared to the angular position I.

In position II, the laser 22 is moved, preferably over the right-hand flank 17b of the remnant 16, until a left-hand flank 17a of the diffuser 10 is exposed. The movement of the laser 22 does not represent a different angular position.

Laser parameters which differ from those in the first laser position I, such as pulse lengths, are preferably also used in position II.

In this case, however, a second partial volume 18 of the remnant 16, a right-hand partial volume 18, also remains, and this cannot be processed in said laser position II since the tip 15 (FIG. 1) would otherwise be removed.

Therefore, in a last process step (FIG. 5), the laser 22 is moved into a different third position III in order to remove the right-hand partial volume 18 so as to produce a film-cooling hole as shown in FIG. 1.

The angular position III of the laser 22 differs from position II, in particular also from angular position I.

The angular positions I, II, III of the laser 22 preferably correspond to the substeps.

The production or the change to the laser positions I, II, III of the laser 22 with respect to the substrate 4 is brought about by the fact that a laser 22 cannot be used if a sectional area is to be produced parallel to the direction of the laser beam, since the laser beam cone has a scatter of 10°, it being the case that the cone cannot overlap a final contour of the region to be produced.

The complicated process steps (possibly different lasers, laser pulses of differing length, different laser removal methods and different laser positions) produce results which are superior to those that would be obtained if the laser/the lasers were used in a single central position of II and III or only in position I.

It is preferable that it is possible to use only one laser 22 for the entire production of the film-cooling hole 1.

However, it is also preferably possible to use two lasers if this is necessary, in particular for the production of the diffuser 10 where different parameters are preferably used for the second laser, and so the lasers 22 have different performance features (power, pulse duration, frequency . . . ).

In this context, provision is made in particular for the laser beam to be oriented such that it includes an angle of greater than 10° and less than 90°, preferably of greater than 15° and less than 80° and particularly preferably of greater than 20° and less than 60° with the traced flank. An angle of 9° is especially preferred.

In one development, provision is made for a pulsed laser beam to be used. In this case, a laser beam with a variable pulse width can be used. The pulse width can lie in the range of 50 ns to 800 ns, preferably of 70 ns to 600 ns and in particular of 200 ns to 500 ns. A pulse width of 400 ns is especially preferred. With such a pulsed laser beam, the component material can be vaporized particularly quickly.

This is particularly advantageous for the production of the diffuser 10, i.e. in the angular positions II, III.

These pulse widths are preferably not used in the angular position I.

A laser beam with a frequency in the range of 20 kHz to 40 kHz, preferably of 25 kHz to 35 kHz and in particular of 28 kHz to 32 kHz can advantageously also be directed onto the component surface. This is particularly advantageous for the production of the diffuser 10, i.e. in the angular positions II, III. These frequencies are preferably not used in the angular position I.

FIG. 6 shows the remnant 16 shown in FIG. 3, where the remnant 16 to be removed is indicated by side-delimiting flanks 17a and 17b on the right-hand and left-hand sides with dashed lines. The overall volume of the remnant 16 to be removed is divided into a left-hand partial volume 28 and a right-hand partial volume 18 likewise with a dashed line.

Figure 7:
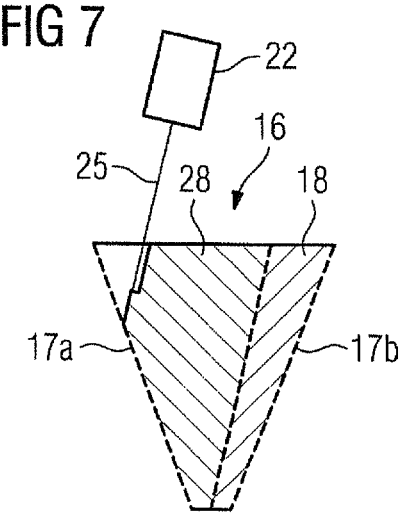
Figure 8:
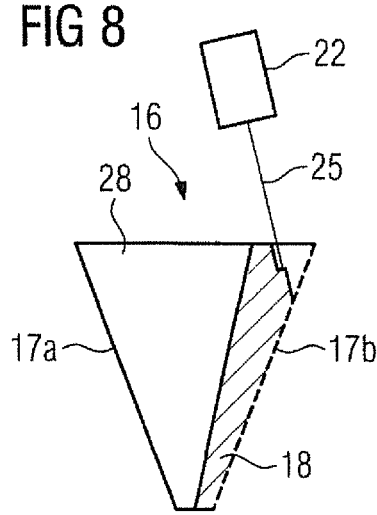

The production of the left-hand partial volume 28 is shown in FIG. 7, and FIG. 8 illustrates the production of the right-hand partial volume 18.

In order to remove the left-hand partial volume 28 of the remnant 16 in a first production step, a laser beam 25 from a laser 22 is discharged onto the component surface. In this process, the laser 22 is oriented such that the laser beam 25 includes an angle of preferably greater than 5° with the left-hand flank 17a, and first strikes that region of the left-hand partial volume 13 which is directly adjacent to the left-hand flank 17, where it vaporizes some of the component material.

The laser beam 25 is further directed onto the component surface until it reaches the left-hand flank 17a. The laser 22 is then moved to the right in the drawing, and so the laser beam 25 strikes component material which is still present in the partial volume 13 and is then vaporized in turn as far as the left-hand flank 17a. In this way, the entire flank 17a of the partial volume 13 is traced with the laser beam 25.

Once the entire partial volume 28 of the remnant 16 has been produced in this way, the laser 22 is rotated counterclockwise and oriented such that the laser beam 25 includes an angle of greater than 8° with the right-hand flank 17b and first strikes that region of the right-hand partial volume 18 which is directly adjacent to the right-hand flank 17b, where it vaporizes some of the component material. Then, in the way which has already been described, the right-hand flank 17b is traced with the laser beam 25 in order to also remove the right-hand partial volume 18 (FIG. 8).

During the removal of the remnant 16, no impermissible interaction occurs between the laser beam 25 and the film-cooling hole 1. Therefore, damage to the flanks of the film-cooling hole 1 is prevented.

Figure 9:
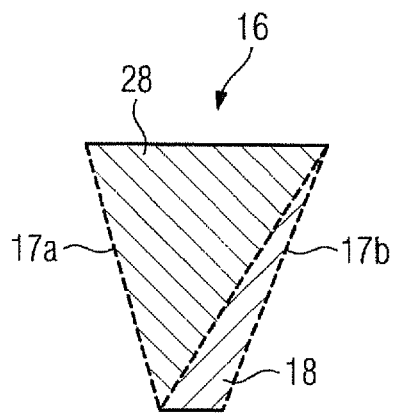

FIG. 9 shows the remnant 16 of FIG. 2 in a schematic illustration, where in this case an alternative hole geometry which is defined by side-delimiting flanks 17a and 17b is indicated.

In the case of this alternative hole geometry, the partial volumes 28 and 18 are arranged one above the other, where the partial volume 18 adjoins the outer surface 12 of the component 1 preferably with the tip.

The alternative removal is carried out in the way which has already been outlined.

The film-cooling hole can also be produced in the manner described above if a metallic bonding layer, preferably of the MCrAlY type, is present on the substrate 4 and/or a ceramic layer is present on an MCrAlY layer or on the substrate 4.

Figure 10:
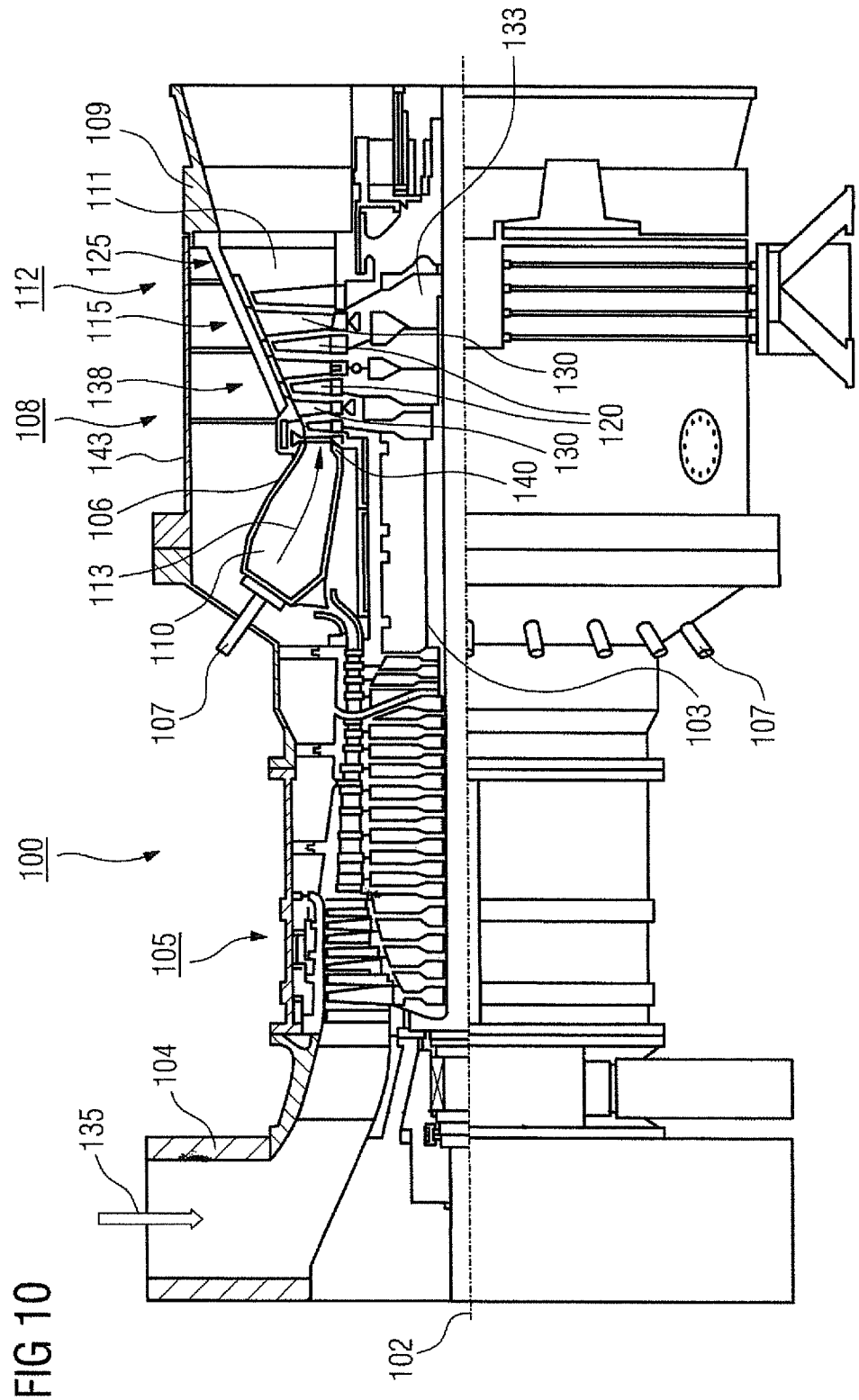
FIG. 10 shows a gas turbine.

FIG. 10 shows, by way of example, a partial longitudinal section through a gas turbine 100.

In the interior, the gas turbine 100 has a rotor 103 with a shaft 101 which is mounted such that it can rotate about an axis of rotation 102 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103. While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses.

To be able to withstand the temperatures which prevail there, they may be cooled by means of a coolant.

Substrates of the components may likewise have a directional structure, i.e. they are in single-crystal form (SX structure) or have only longitudinally oriented grains (DS structure).

By way of example, iron-base, nickel-base or cobalt-base superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949.

The blades or vanes 120, 130 may likewise have coatings protecting against corrosion (MCrAlX; M is at least one element selected from the group consisting of iron (Fe), cobalt (Co), nickel (Ni), X is an active element and stands for yttrium (Y) and/or silicon, scandium (Sc) and/or at least one rare earth element, or hafnium). Alloys of this type are known from EP 0 486 489 B1, EP 0 786 017 B1, EP 0 412 397 B1 or EP 1 306 454 A1.

It is also possible for a thermal barrier coating to be present on the MCrAlX, consisting for example of $ZrO_2$, $Y_2O_3$—$ZrO_2$, i.e. unstabilized, partially stabilized or fully stabilized by yttrium oxide and/or calcium oxide and/or magnesium oxide.

Columnar grains are produced in the thermal barrier coating by suitable coating processes, such as for example electron beam physical vapor deposition (EB-PVD).

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

Figure 11:
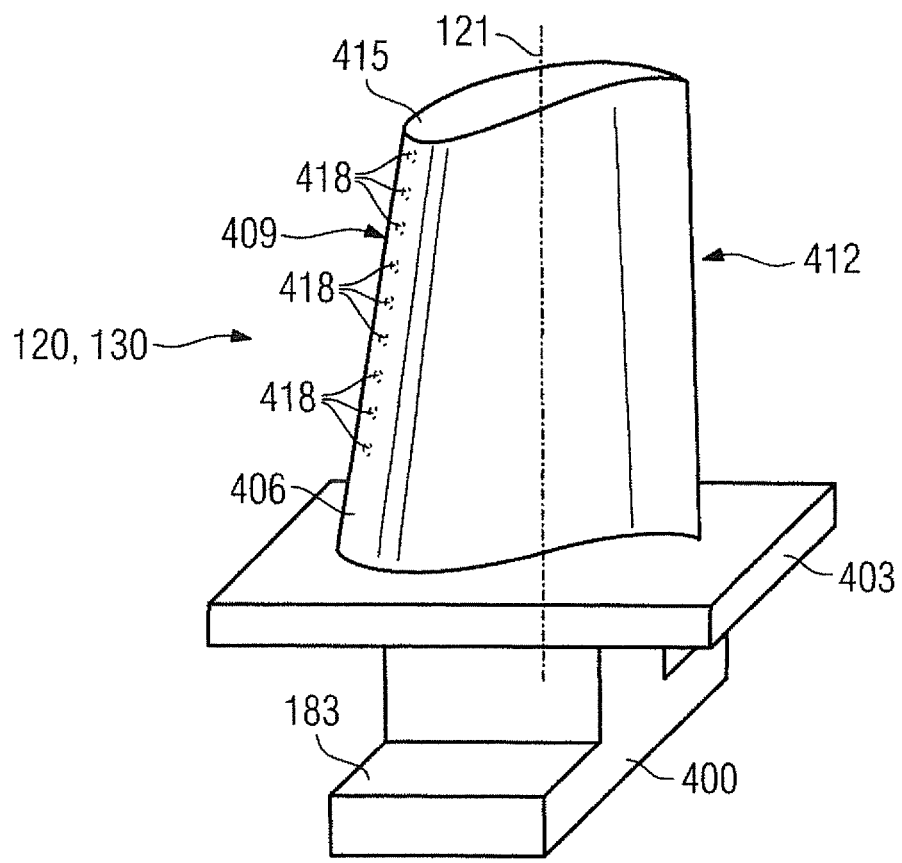
FIG. 11 shows a turbine blade or vane.

FIG. 11 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 and a blade or vane tip 415.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400. The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949.

The blade or vane 120, 130 may in this case be produced by a casting process, by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures). Processes of this type are known from U.S. Pat. No. 6,024,792 and EP 0 892 090 A1.

The blades or vanes 120, 130 may likewise have coatings protecting against corrosion or oxidation e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf)). Alloys of this type are known from EP 0 486 489 B 1, EP 0 786 017 B 1, EP 0 412 397 B1 or EP 1 306 454 A1.

The density is preferably 95% of the theoretical density.

A protective aluminum oxide layer (TGO=thermally grown oxide layer) is formed on the MCrAlX layer (as an intermediate layer or as the outermost layer).

The layer preferably has a composition Co-30Ni-28Cr-8Al-0.6Y-0.7Si or Co-28Ni-24Cr-10Al-0.6Y. In addition to these cobalt-base protective coatings, it is also preferable to use nickel-base protective layers, such as Ni-10Cr-12Al-0.6Y-3Re or Ni-12Co-21Cr-11Al-0.4Y-2Re or Ni-25Co-17Cr-10Al-0.4Y-1.5Re.

It is also possible for a thermal barrier coating, which is preferably the outermost layer and consists for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX.

The thermal barrier coating covers the entire MCrAlX layer. Columnar grains are produced in the thermal barrier coating by suitable coating processes, such as for example electron beam physical vapor deposition (EB-PVD).

Other coating processes are possible, for example atmospheric plasma spraying (APS), LPPS, VPS or CVD. The thermal barrier coating may include grains that are porous or have micro-cracks or macro-cracks, in order to improve the resistance to thermal shocks. The thermal barrier coating is therefore preferably more porous than the MCrAlX layer.

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (indicated by dashed lines).

The invention claimed is:

1. A process for producing a hole in a substrate, the hole is a continuous film-cooling hole, the substrate having a first surface and an opposing surface, the hole includes an inner proportion and a diffuser which has a widened cross section compared to the inner proportion, comprising:
   providing a laser positioned in a first angular position; and
   forming the inner proportion from the first surface to the opposing surface and a portion of the diffuser at the first surface by the laser in the first angular position, a remnant of the diffuser remains after the forming, the remnant having a first remnant volume and a second remnant volume;
   removing the first remnant volume by the laser positioned in a second angular position such that the second remnant volume remains, the laser is moved while remaining in the second angular position until a flank of the diffuser is exposed, the laser beam in the second angular position is directed differently than the laser beam while in the first angular position; and
   removing the second remnant volume by the laser in a third angular position such that the diffuser is completely formed, the laser beam in the third angular position is directed differently than the laser beam while in the second angular position,
   wherein angular positions of the laser are defined by a center line of the laser beam and the first surface.

2. The process as claimed in claim 1, wherein the laser is not moved during the forming of the inner proportion.

3. The process as claimed in claim 1, wherein a plurality of lasers with different performance features are used.

4. The process as claimed in claim 1, wherein different laser parameters are used for forming the inner proportion than for removing at least one of the remnant volumes.

5. The process as claimed in claim 1, wherein the laser in the second angular position is moved so that the laser beam is moved over an inner flank of the remnant during producing the diffuser.

6. The process as claimed in claim 1, wherein during each of the removals the respective volume of the remnant is removed by tracing a side flank of the remnant of the diffuser with the laser, and wherein the laser is oriented such that the laser includes an angle of greater than 8° with the traced flank.

7. The process as claimed in claim 6, wherein the laser is oriented such that the laser includes an angle of greater than 20° and less than 60° with the traced flank.

8. The process as claimed in claim 1, wherein a pulsed laser is used.

9. The process as claimed in claim 1, wherein a laser with a variable pulse width is used for removing at least one of the remnant volumes.

10. The process as claimed in claim 1, wherein a laser with a pulse width in the range of 200 ns to 500 ns is used for removing at least one of the remnant volumes.

11. The process as claimed in claim 1, wherein a laser beam with a frequency between 28 kHz to 32 kHz is used for removing at least one of the remnant volumes.

12. The process as claimed in claim 1, wherein
   the continuous hole is formed in a turbine component with a substrate,
   a geometry of the diffuser differs significantly from a geometry of the inner proportion,
   a cross section of the diffuser increases compared to a cross section of the inner proportion, and
   the diffuser is asymmetrical.

13. The process as claimed in claim 1, wherein a laser with a pulse width in the range of 50 ns to 800 ns is used for removing at least one of the remnant volumes.

14. The process as claimed in claim 1, wherein a laser beam with a frequency between 20 kHz to 40 kHz is used for removing at least one of the remnant volumes.

15. The process as claimed in claim 1, wherein a single laser is used during the process.

16. The process as claimed in claim 8, wherein the pulsed laser is used only during the removing of at least one of the remnants and not during the forming of the inner proportion.

17. The process as claimed in claim 1,
   wherein the laser is has a different focal point while in the first angular position than while in the second angular position.

18. The process as claimed in claim 1,
   wherein the laser is moved while remaining in the second angular position such that the beam traces a surface of the diffuser being formed from the removal of the first remnant.

19. The process as claimed in claim 1,
wherein the laser is moved while remaining in the second angular position such that the center line of the laser beam changes in relation to a surface of the diffuser being formed from the removal of the first remnant.

20. the process as claimed in claim 1,
wherein a cross section at the first surface includes an area of the first and of the second remnant.

21. the process as claimed in claim 1,
wherein the first remnant has a first side formed at a first angle relative to the first surface, the angle being a other than a right angle, and
wherein the second remnant has a fist side being adjacent to the first side of the first remnant.

* * * * *